Inventors
Herbert M. Reeves
John B. Mattis
By Carlson, Pitzner, Hubbard & Wolfe
Attorneys

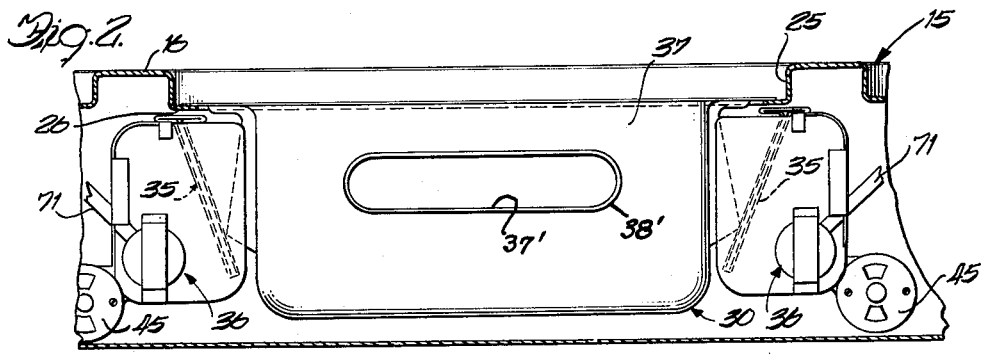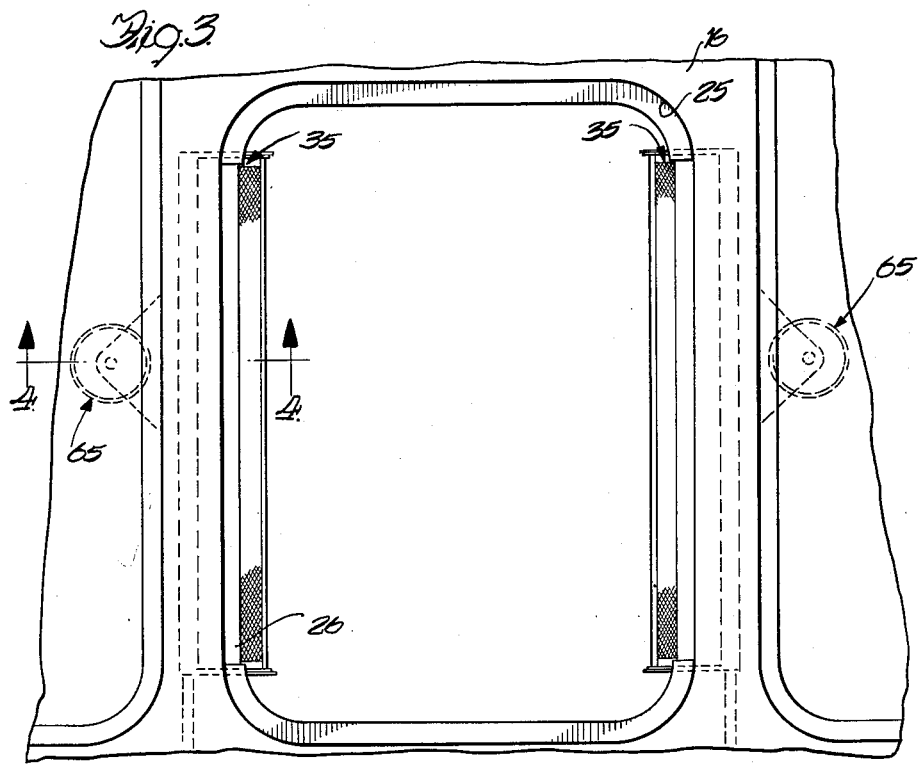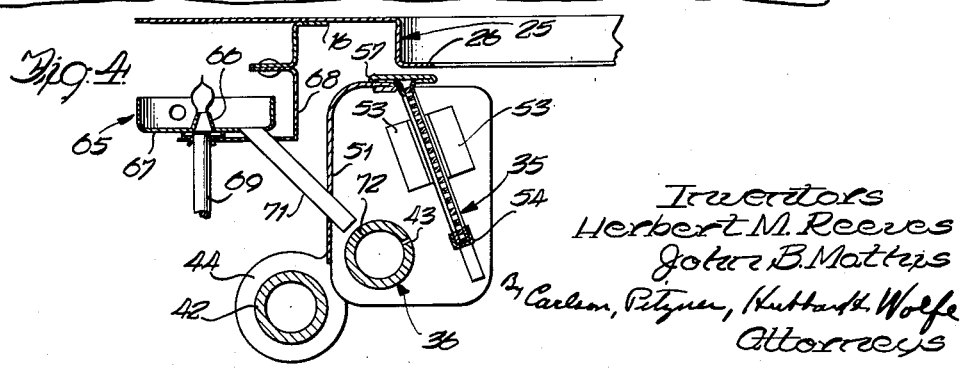

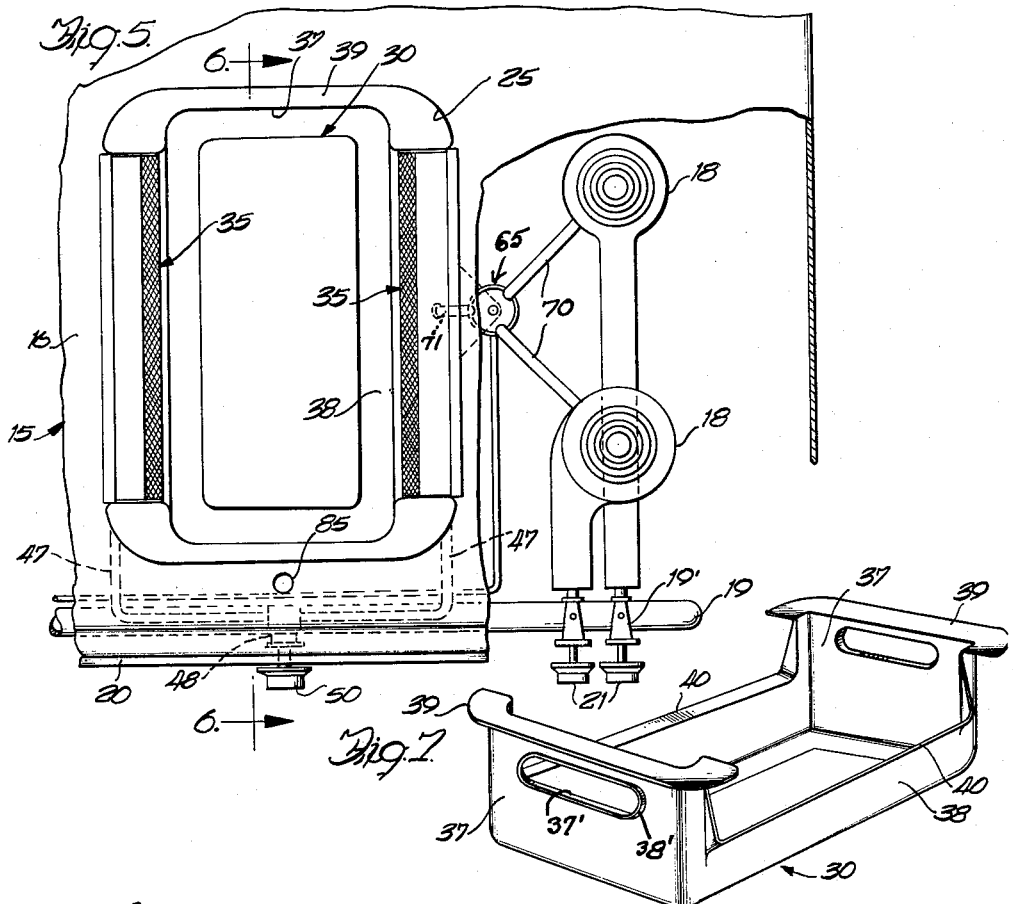
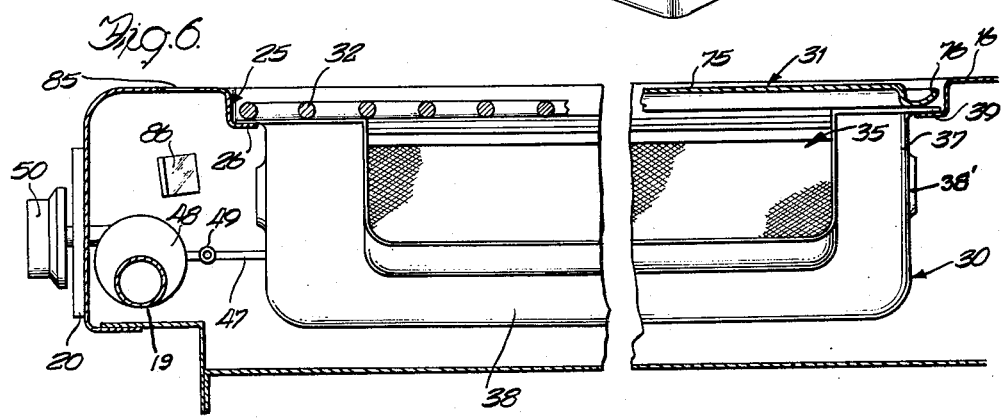

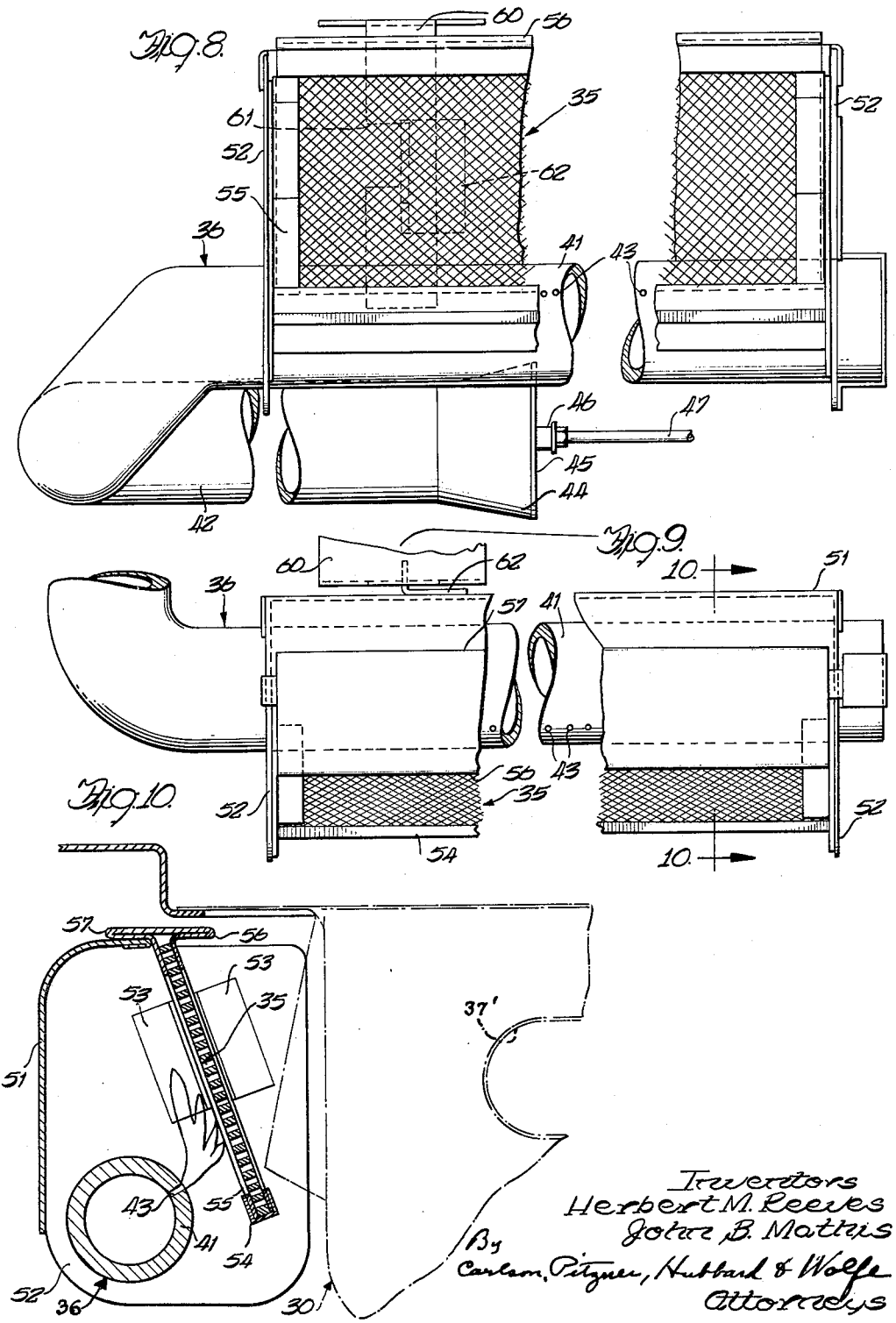

United States Patent Office 3,008,406
Patented Nov. 14, 1961

3,008,406
COOKING UNIT
Herbert M. Reeves, Kankakee, and John B. Mathis, Chicago, Ill., assignors to Geo. D. Roper Corporation
Filed May 6, 1957, Ser. No. 657,247
3 Claims. (Cl. 99—446)

The invention relates to cooking appliances generally and more particularly to an improved cooking unit with which a wide variety of cooking operations may be performed.

One object of the invention is to provide a gas heated cooking unit with which frying, broiling, barbecuing and other cooking operations may be carried out conveniently and efficiently.

Another object is to provide a gas heated cooking unit of the above general character which may be incorporated as an integral part of a kitchen range either of the conventional type or the countertop installed type or which may be manufactured and sold as a separate and independent appliance.

Another object is to provide a cooking unit of simple and inexpensive construction which can be easily and quickly conditioned for efficiently performing any one of a number of different types of cooking.

Another object is to provide a gas heated cooking unit with which meat and similar foods may be broiled efficiently substantially without smoke or fumes and with little or no spattering of grease or juices used or generated in the broiling operation.

Still another object is to provide a gas heated cooking unit that can be adapted for either frying or broiling by the simple interchange of a griddle plate and a broiler rack.

A further object is to provide a gas heated cooking unit with which food items can be broiled on one side at a time or on both sides simultaneously as desired.

A more specific object is to provide a cooking unit particularly well adapted for frying and broiling operations and having readily interchangeable components by which it may be quickly and easily converted to an efficient rotisserie or barbecuing device.

It is also an object of the invention to provide an improved gas burner for cooking units of the above type adapted to perform its function largely through the use of radiant heating.

Other objects and advantages of the invention will become apparent from the following detailed description of the preferred embodiment illustrated in the accompanying drawings in which:

FIG. 2 is a fragmentary transverse sectional view through the range top showing the unit in end elevation but with the food supporting means removed.

FIG. 3 is a fragmentary plan view of the range top showing the unit with the drip pan in place but without the food supporting means.

FIG. 4 is a fragmentary sectional view taken in a a plane substantially on the line 4—4 of FIG. 3.

FIG. 5 is a fragmentary plan view of the range top showing the arrangement for lighting the unit burners from the pilot provided in connection with the range top burners.

FIG. 6 is a fragmentary sectional view taken in a plane substantially on the line 6—6 of FIG. 5 showing alternative mounting of a broiling rack and a griddle plate.

FIG. 7 is a perspective view of the drip pan constituting an element of the unit.

FIG. 8 is an enlarged fragmentary front view of one of the burners provided in the exemplary unit.

FIG. 9 is an enlarged fragmentary top view of the burner shown in FIG. 8.

FIG. 10 is an enlarged sectional view through the burner taken in a plane substantially on the line 10—10 of FIG. 9.

Figure 1:
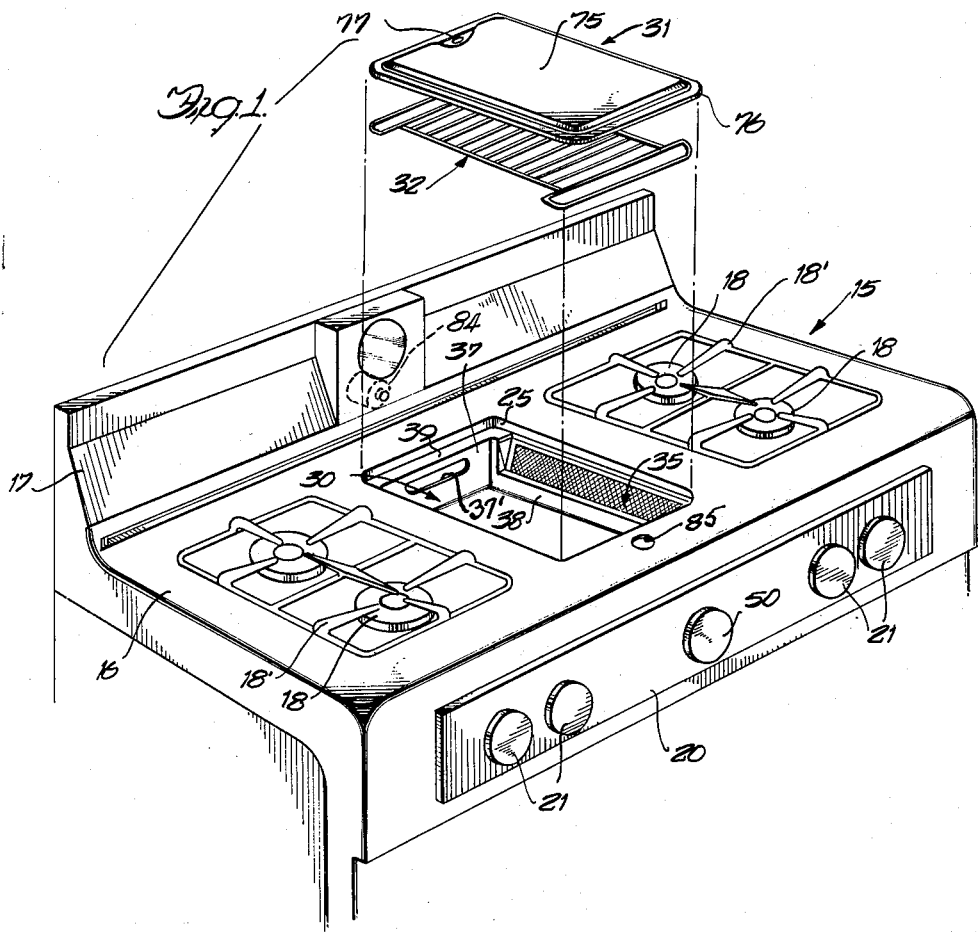
FIGURE 1 is an exploded perspective view of a cooking unit embodying the features of the invention shown as incorporated as an integral part of a kitchen range.

While a preferred form of the invention has been shown and will be described in detail herein, there is no intention to limit the invention to the specific form shown nor to its use in the particular environment in which it has been illustrated. On the contrary, the intention is to cover all adaptations and modifications, as well as other types of installation for which it is suited and coming within the spirit and scope of the appended claims.

Referring to the drawings the gas range 15 has the usual top panel 16 defining a flat horizontal cooking surface bordered at its back edge by an upstanding splasher back 17. In the particular range shown the cooking surface is equipped with four top burners 18 arranged in pairs adjacent oposite ends of the top panel which is suitably apertured and recessed to accommodate the burners and grates 18' for supporting utensils above the burners. Gas is supplied to the burners from the usual manifold 19 through suitable valves 19' (FIG. 5) located adjacent the front of the range and having their stems extended through a control panel 20 for the reception of knobs 21 by which the valves may be opened and closed.

To adapt the range top for the accommodation of the cooking unit of the present invention, the top panel 16 is formed with a generally rectangular opening 25 centered in this instance between the top burner pairs. As shown in FIGS. 2 and 6 the edges of the top panel around the opening 25 are formed downwardly and inwardly to present a horizontal ledge 26 offset downwardly from the top surface of the panel. This ledge provides registering support for a drip pan 30 and for a series of interchangeable food supporting elements including a griddle plate 31 and a broiling rack 32 shown in FIG. 1.

Top mounted griddles heated by conventional gas burners are provided as accessories in many stoves. To obtain uniform heating the burners, as a practical matter, are mounted directly below the griddle plate and usually are of a size sufficient to direct flames aginst substantially the entire bottom area of the griddle. Such gridlde assemblies are not suitable for broiling and comparable operations in which the food is supported on an open rack. One reason is that excessive amounts of smoke and fumes are produced by the grease and juices generated or used in the cooking operation which drip onto the hot burner. Broiling and similar operations have therefore been confined largely to range ovens and comparable installations where the use of an overhead burner is possible.

The present invention overcomes the above difficulties and provides a simple cooking unit adapted for mounting in the top of a cabinet, counter, kitchen range or other structure by which such diverse cooking operations such as frying, broiling or barbecuing can be carried out without the production of smoke and fumes in an efficient and practical manner. By reason of the novel construction of the cooking unit it may be quickly and easily adapted for any of those types of cooking by a mere interchange of the food supporting elements provided with the unit.

The universal adaptability of the improved unit is made possible by the novel construction and arrangement of the unit whereby the heat for all cooking operations is directed to the cooking zone from below by a radiant heating element or elements disposed in a unique manner which permits efficient heat utilization yet effectively removes the elements from the path of grease or liquids dripping from food supported in the cooking zone. An important factor in the practical adaptation of this new mode of cooking is the novel construction of the drip pan 30 and its relation to the heating element or elements which enables the pan to catch and hold the dripping grease or liquid without interfering with the transmission of heat to the cooking zone.

The exemplary cooking unit has been shown as equipped with two similar radiant heating elements 35, although only one element or more than two may be provided if desired. Since the heating elements are alike a description of one will suffice. Briefly, each heating, or radiant, element comprises an elongated relatively narrow strip or plate of metal or other suitable material that does not deteriorate upon repeated heating to a high temperature. The element 35 as shown comprises a strip of expanded metal as, for example, stainless steel. In the exemplary cooking unit the elements 35 are heated by gas burners 36 (FIGS. 2, 4, 8 and 9) to be described in detail later on. It is to be understood, however, that other types of heating devices may be employed if desired, without departing from the broader aspects of the invention.

In carrying out the invention the heating elements 35, when two are used, are supported below the top panel 16 adjacent opposite sides of the opening 25 with each element inclined in a direction to direct radiant heat inwardly as well as upwardly toward the opening 25 as shown in FIGS. 2, 3 and 5. More particularly, the heating elements are disposed in positions such that they may effectively radiate heat to a cooking zone substantially within the area of the opening 25 but, at the same time they are out of the direct path of grease or juices dripping from food supported in that zone. Furthermore, the heating elements are spaced apart laterally a sufficient distance to accommodate the drip pan 30 which is thus enabled to catch and hold the drippings from the food.

The drip pan 30 is constructed in a novel form to enable it to perform its drip catching functions without interference with the heating elements 35. For this purpose the pan is constructed as shown in FIG. 7 with relatively high end walls 37 and substantially lower lateral or side walls 38. The end walls have their upper edges flanged outwardly as at 39 to engage the ledge 26 of the top panel 16 and thus provide support for the pan. The height of the end walls 37 is preferably such that the grease and liquids collecting in the pan are sufficiently far removed from the cooking zone so that they are not heated to an excessively high temperature. It will be appreciated, of course, that the height may be varied as required by the clearance between the panel 16 and the underlying partition or other element of the range or cabinet structure in which the unit is installed.

The side walls, being relieved as shown in the drawings, define windows extending along substantially the entire length of the opening 25 through which heat is radiated inwardly and upwardly into the space above the drip pan.

Elongated slots 37' in the end walls 37 afford convenient hand hold by which the pan may be lifted through the opening for disposal of collected liquids and cleaning. Preferably, the marginal edges around the opening are flanged as at 38' to eliminate sharp edges. The slots 37' perform additional functions as will appear presently.

The side walls 38 of the pan have their upper edges recessed or cut back so as to expose substantially the entire area of each heating element 35 to the interior of the cooking unit. The upper edge portion of each side wall is flanged otuwardly as at 40 so as to project into the vicinity of and preferably overlie the lower edge of the adjacent heating element 35. The flange 40 thus serves to intercept the air rising along the sides of the drip pan, thereby preventing cold air currents from reaching the food undergoing cooking.

Turning now to a more detailed description of the heat source or burner 36 for the radiant heating element 35 and the means for supporting that element in the unit, reference may be had to FIGS. 8–10 of the drawings. As there shown the burner 36 comprises an elongated tube bent back upon itself to provide parallel substantially straight sections 41 and 42. The section 41 approximates the element 35 in length and is formed with a longitudinally extending row of small burner ports 43. The section 42 is somewhat shorter than the companion section and terminates in an enlarged bell-like end portion 44 closed by an apertured damper plate 45 through which gas and air are admtited in the manner customary with gas burners. Gas is supplied to the burner 36, in this instance, by way of a nozzle 46 and conduit 47 extending to a manually operable valve 48 (FIG. 5) supported adjacent the control panel 20 of the range. When two radiant elements 35 and associated burners 36 are employed, the conduits 47 branch from a T fitting 49 adjacent the valve. In the exemplary installation the valve 48 is manually opened and closed by a knob 50 mounted in the usual manner on the stem of the valve.

To hold the burner 36 and element 35 in heat exchanging relation and to prevent the top panel 16 of the range from becoming unduly heated, a sheet metal casing is provided which includes an elongated back wall member 51 welded or otherwise suitably attached at opposite ends to a pair of sheet metal end members 52. As shown in FIG. 10 the back wall member 51 has its upper edge portion bent over to overlie the section 41 of the burner and spaced downwardly from the top panel 16 to allow free circulation of air under the latter. Secured to each of the end members 52 is a pair of angle brackets 53 spaced apart to define channels for slidably receiving the heating element 35. A channel 54 extending between the end members is positioned to receive the lower end of the element 35.

In the particular embodiment illustrated the heating element 35 is enclosed in a sheet metal frame 55, the upper portion of which is formed over to define forwardly and rearwardly projecting flanges 56 and 57. The latter flange is adapted to rest on the bent over edge portion of the member 51 and effectively closes the burner casing to prevent escape of hot gases against the underside of the range top panel 16. The forwardly projecting flange 56 serves to deflect rising hot gas toward the opening 25 to further reduce the heating of the top panel 16 around the opening.

End members 52 are apertured to receive the burner section 41 and to retain it with the ports 43 positioned to direct flames toward the element 35 as shown in FIG. 10. Accordingly, when the burner is operating the element 35 is quickly heated to a red heat over an area determined by the amount of gas discharged through the burner ports. Thus, when the gas supply is restricted only a small band of the element adjacent its lower edge will be heated to redness. At full operation the entire area of the element is heated to redness. The back wall member 51 enhances the heating effect by reflecting heat toward the element.

Suitable means is provided for securing the assembled burner and casing in place in the range or to the structure in which it is installed with the elements positioned to direct radiant heat generally upwardly and inwardly toward the cooking zone defined by the opening 25. The means for mounting the burner assembly as herein shown comprises one or more bayonet type connecting devices, each comprising a bracket 60 (FIGS. 8 and 9) welded or otherwise secured to the stove structure. The bracket has an upright portion formed with a rearwardly opening slot 61 adapted to receive a T-shaped connector 62 welded to the back of the casing member 51 and projecting laterally therefrom. The arrangement is such that the cooperating elements of the connecting device may be interlockingly engaged by a slight forward shifting of the assembly when the elements are alined for mating engagement. It will be understood, of course, that the connecting device or devices are arranged to locate the burner in position to receive the gas supply nozzle 46 in proper relation to the damper member 45 in the assembly of the unit.

When the assembly is installed and secured in place in the above manner, the radiant elements 35 are disposed in an inclined position by reason of their mounting in the casing. The inclination of the elements is determined by a number of factors such as the width of the opening in which the broiler rack 32 is mounted and the vertical spacing of the elements from the plane of the top panel 16. In a typical instance, the edge of a food item such as a steak may be approximately two and one-half inches from the center line of the adjacent element while the center of the item is approximately five and three-fourths inches from that center line. Under such conditions it has been found that uniform heating is obtained with the elements 35 tilted or inclined approximately 20° from the vertical as shown in FIGS. 4 and 10. With this arrangement the outer edges of the food item receive the major portion of its heat from the nearest element while the central portion of the element receives heat from both elements. The heat received from one element gradually decreases in the direction of the other element, but since the areas heated by the two elements overlap, the result is substantially uniform heating of the entire area of the rack or broiling zone.

It will be understood that with other spacings of the radiant elements 35 with respect to each other and to the plane of the broiling rack, different inclinations of the elements may be required to provide uniform heating. Within the practical limits of top units as presently known, inclination of the elements may vary between the limits of 10° and 45°.

While any suitable means may be provided for lighting the burners, it is preferred to provide automatic lighting means which becomes effective immediately upon opening the gas valve 48. For this purpose, the unit is provided with a suitable pilot burner of the type conventionally used in gas ranges. When the unit is installed in a kitchen range, the burner 36 may be lighted conveniently from the pilot burner 65 normally provided for lighting the top burners 18. As shown in FIGS. 4 and 5, the pilot burner 65 of the exemplary range is supported substantially midway of the burners 18 adjacent the edge of the opening 25 in the top panel 16. The burner 65 as shown comprises a conventional single port burner 66 formed in or suitably secured to the bottom wall of a cup-shaped sheet metal housing 67. The housing is supported by a bracket 68 from the top panel 16, the bracket being apertured to receive the end of a conduit 69 through which gas is supplied to the burner.

For top burner lighting, a flashback tube 70 extends from each burner 18 to the housing 67 which has apertures in its side wall for accommodating the tubes. The burner casing 65 also has an aperture in its bottom wall for receiving a flash tube 71 which extends through alined apertures in the bracket 68 and casing wall member 51 to a lighter port 72 provided in the burner section 41. Accordingly, upon admission of gas to the burner 36, a small quantity of the gas is discharged through the tube 71 to be ignited by the pilot burner and the flashback immediately ignites the gas issuing from the burner ports 43.

As indicated heretofore, a wide variety of food supports may be used with the improved cooking unit to adapt it for frying, broiling, barbecuing and other cooking operations. For frying, the griddle plate 31 is supported in the opening 25 upon the ledge 26 to receive heat from the radiant elements 35. The griddle plate may comprise a rectangular metal plate of cast aluminum or other suitable metal having a smoothly finished upper cooking surface 75 bordered by a depressed marginal portion 76 (FIGS. 1 and 6) defining a grease collecting channel. An outlet opening 77 may be provided at one end of the plate for discharging collected grease to the drip pan 30.

The broiling rack 31 may be a conventional wire rack or an appropriately perforated metal plate. The end portions of the rack are preferably dimensioned to fit snugly into the ends of the opening 25 and rest on the ledge 26. The rack is thus supported in the cooking zone and is securely held against lateral movements. The central portions of the rack may be somewhat narrower than the end portion to provide clearance between the adjacent edge of the panel 16 and the food supported on the rack.

Figure 11:
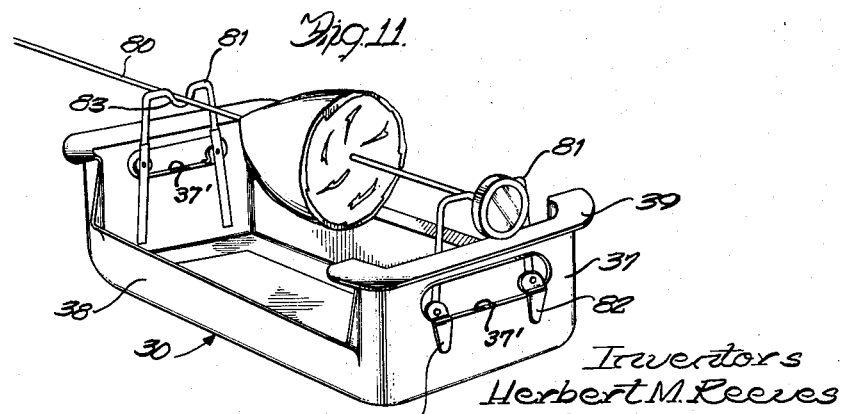
FIG. 11 is a perspective view of the drip pan with the removable elements in place for supporting a rotary spit.

For barbecuing and comparable broiling operations, the food to be cooked is desirably supported by a spit 80 (FIG. 11) disposed in a position to present the food in the cooking zone. In the improved cooking unit, provision is made for quickly and easily adapting the unit for the use of such a spit when desired. To this end the unit includes a pair of spit supporting brackets 81 adapted to be detachably mounted at opposite ends of the drip pan 30. The brackets as shown are constructed of heavy wire or bar stock and are generally U-shaped in form. The legs of each bracket are adapted to extend along the inner face of one of the end walls of the drip pan and each leg is provided with a pivoted clamping finger 82 adapted to extend through the hand hole 37' in the wall and to turn downwardly to clamp the support in place as shown.

The top portion of each support 81 has a central downward bend 83 defining a cradle for the reception of a spit. For operation as a rotisserie, the structure in which the unit is installed is provided with a spit turning motor 84 of conventional type supported with its driving socket positioned to receive the inner end of the spit when the latter is supported on the brackets 81. In the case of kitchen ranges such as that shown, the motor 84 may be mounted in the splasher back 17 as indicated at FIG. 1.

It will be appreciated that the spit 80 may be employed without the driving motor 84 if desired. In that case, the spit can be turned by hand or, alternatively, food items may be supported from the spit by hooks or the like which allow the food items to hang down between the two radiant heating elements 35. Food thus supported is broiled or cooked on both sides simultaneously.

The operation of the improved cooking unit and its convenient adaptability to different cooking operations will be readily apparent from the foregoing description. To summarize briefly, the unit may be adapted for frying or similar cooking operations by simply placing the griddle plate 31 above the opening in which the drip pan 30 is supported. When the burners 36 are turned on, the gas issuing from the ports 43 is immediately ignited from the pilot burners and the elements 35 are quickly heated throughout their entire length. Due to their orientation the heating elements radiate heat upwardly against the bottom of the griddle plate and quickly bring it to a desired cooking temperature.

Since the elements 35 are concealed from direct view when the griddle plate is in use, a viewing window 85 is provided in the top panel 66 forwardly of the opening 25 as shown in FIGS. 1, 5 and 6. A mirror 86 of stainless steel or the like supported below the window substantially at the level of the hand hold slot 37' in the drip pan is orientated to afford a clear view of one of the elements through the slot. By noting the area of the element heated to a red heat, the gas supply may be adjusted to provide any desired rate of heating.

To adapt the unit for broiling, the griddle plate 31 is replaced by the broiling rack 32. This rack supports food items in the cooking zone with their lower surfaces exposed to the radiant heat produced by the elements 35.

Upwardly flowing hot air and gas is also directed against food supported by the rack, thus avoiding wastage of heat and further increasing the efficiency of the unit. Grease and juices are caught by the pan 30 and held far enough from the cooking zone to avoid excessive heating. Since the elements 35 are removed from the direct path of the drippings, production of smoke and fumes characteristic of most broiling operations, is notably absent in the case of broiling operations carried on with the improved unit.

It will be appreciated that conventional cooking utensils such as pots and pans may be heated effectively by placing them on the rack 32. Accordingly, all of the usual cooking operations ordinarily performed on top burners may be carried out with equal efficiency with the unit. Likewise baking appliances of the type commonly known as "Dutch ovens" may be operated efficiently by placing them above the unit.

For barbecuing and like cooking operations, the brackets 81 are attached to the drip pan 36 which is then placed within the opening 25 between the elements 35. Food items either skewered on the spit or suspended from it from hooks are supported in the cooking zone when the spit is placed on the cradles 83. During the cooking operations the spit may be turned manually or by a motor provided on the structure in which the unit is installed.

Cleaning of the unit is greatly facilitated by the easy removability of the drip pan 30. After a cooking operation, the pan is withdrawn through the opening 25 by grasping the hand holes 37' in the end walls and the pan simply lifted through the opening. The major portion of the drippings are caught in the pan and retained in a zone spaced far enough from the cooking zone to prevent excessive heating. Any slight spattering such as might occur in barbecuing, is intercepted by the end walls of the pan or by the radiant heating elements. Due to the high temperature at which these elements operate, the spattering material is immediately vaporized instead of being converted to smoke so that even this small amount does not produce visible smoke in a barbecuing operation.

It will be apparent from the foregoing that the invention provides a universal cooking unit of novel and advantageous construction. While particularly adapted for the use of gas as fuel, certain aspects of the invention can be used to advantage with electric heating elements. Due to the novel construction of the heating elements and particularly their unique positioning with respect to the cooking zone, the unit can be readily adapted for frying, broiling or barbecuing. Those operations may be carried out conveniently and efficiently with practically no smoke or fumes.

The unit has the additional advantage of lending itself readily to installation in kitchen ranges and has been shown herein as incorporated as an integral part of such a range. This merely exemplifies one way in which the unit may be utilized to advantage. It will be apparent that the unit may be employed with any of a number of structures as, for example, cabinets or counters presenting horizontal top surfaces with sufficient clearance below the top to accommodate the elements which make up the unit. It may, of course, be combined with conventional top burners in a counter top cooking appliance or it can be made and sold as a separate independent appliance, if desired. Thus, in the following claims the term "horizontal cooking surface" denotes any surface surrounding the cooking unit and with respect to which the drip pan is recessed. Where the invention is applied to a range, this cooking surface will normally have, as here, a plurality of top burners.

We claim as our invention:

1. A cooking unit adapted to be installed in an opening in a horizontally disposed top panel, a drip pan supported below the opening, an elongated radiant heating element supported below the panel at one side of said pan in a position to radiate heat generally upwardly toward said opening, a gas burner for heating said element, a valve operable manually to regulate the amount of gas supplied to said burner, a viewing window in the top panel adjacent the forward end of the opening, and a mirror supported below said window oriented to afford a view of a portion of said element through said window.

2. The combination with a horizontal top panel having an opening therein, of an elongated radiant heating element supported below the panel at one side of the opening, a gas burner operative to heat said element, a manually operable valve controlling the supply of gas to said burner, a drip pan having relatively high end walls flanged at their upper edges for engagement with the panel to support the pan below the opening, said pan having at least one side wall recessed to expose said heating element, said end walls being formed with elongated horizontally disposed slots defining hand holds for lifting said pan through the opening, a window in the panel adjacent the forward edge of the opening, and a mirror supported below said window oriented to afford a view of a portion of said heating element through the slot in one end wall of said pan.

3. In a gas range having a top surface member with a rectangular opening formed therein, the combination comprising means for supporting food in alignment with said opening, a pair of elongated burners arranged below the level of said opening and on respectively opposite sides thereof, a pair of radiants respectively interposed between said burners and said opening and arranged for heating by said burners, means including a drip pan having end walls and side walls and of an area substantially coextensive with that of said opening and having a lower surface arranged below the level of said radiants, means for supporting the drip pan within said opening with the upper edge of opposite end walls thereof adjacent the top surface member, each side wall of said drip pan having a portion cut out and extending along the entire length of said opening to afford passage for heat radiated from said radiants, said radiants being behind the confines of said opening so that drippings from the food are free to fall into the drip pan without striking said radiants, said radiants each having a radiating surface inclined with respect to the vertical at an angle in the range of 10° to 45° to adapt them for directing radiant heat upwardly and inwardly against the food on the support with a minimum heating of the drippings collected in said drip pan, and outwardly turned flanges on said side walls adjacent the lower edges of said cut out portion and extending laterally to overlie the lower edges of said radiants so as to direct rising air currents adjacent said radiants.

References Cited in the file of this patent

UNITED STATES PATENTS

| | | |
|---|---|---|
| 462,921 | Gibbons | Nov. 10, 1891 |
| 521,718 | Koll | June 19, 1894 |
| 706,502 | Van Wie | Aug. 5, 1902 |
| 1,734,138 | Lehmann | Nov. 5, 1925 |
| 2,604,150 | Taylor | July 22, 1952 |
| 2,766,683 | Kanz | Oct. 16, 1956 |
| 2,787,948 | Mathis | Apr. 9, 1957 |